Jan. 5, 1960

W. R. DRESSER 2,920,134

CUE BOARD AND SPOT PROJECTION FOR
ELECTRONIC PICTURE TAKING

Filed Oct. 19, 1953

INVENTOR.
Willis Robert Dresser.
BY Emery, Varney,
Whittemore & Dix.
ATTORNEYS

United States Patent Office 2,920,134
Patented Jan. 5, 1960

2,920,134

CUE BOARD AND SPOT PROJECTION FOR ELECTRONIC PICTURE TAKING

Willis Robert Dresser, Long Hill, Conn., assignor, by mesne assignments, to The Prudential Insurance Company of America, a corporation of New Jersey Application October 19, 1953, Serial No. 387,010
7 Claims. (Cl. 178—5.8)

This invention relates to apparatus for transmitting information and directions to actors in the field of an electronic camera.

One object of the invention is to provide improved means for projecting information and instructions into an arena which is being televised or photographed by means of an electronic camera. Another object is to project the information and instructions so as to provide a cue indicator having surfaces within a televised area which appear normal to the television camera at the same time that they are being used to provide information to the actors in the scene, or to others at locations about the set. The information provided is visible to the camera man, but the illumination is so controlled that it is not picked up by the electronic camera, nor is it visible to anyone in the television audience.

Another object is to provide a director of a television scene with a portable hand light, which may be similar to a flash light for spot direction to direct the action within the televised scene, without having the light visible to the camera and the television audience.

The picture tubes of television cameras are provided with a power supply having a cycle which causes the picture tube to transmit impulses for a predetermined period followed by a non-transmitting period during which the picture tube is "blind." This invention operates the cue indicator in synchronism with the power supply of the electronic tubes so that the cue indicator is illuminated during the periods when the picture tube is blind, and the cue indicator is not illuminated during the intervening periods when the picture tube transmits impulses in accordance with the image focused on the tube. Since the power supply to the picture tube is at a high frequency, the periods of illumination of the cue indicator follow one another in rapid succession and the cue indicator appears to have continuous illumination as a result of the observer's persistence of vision.

Other objects, features and advantages of the invention will appear or be pointed out as the description proceeds.

Figures 1, 2:
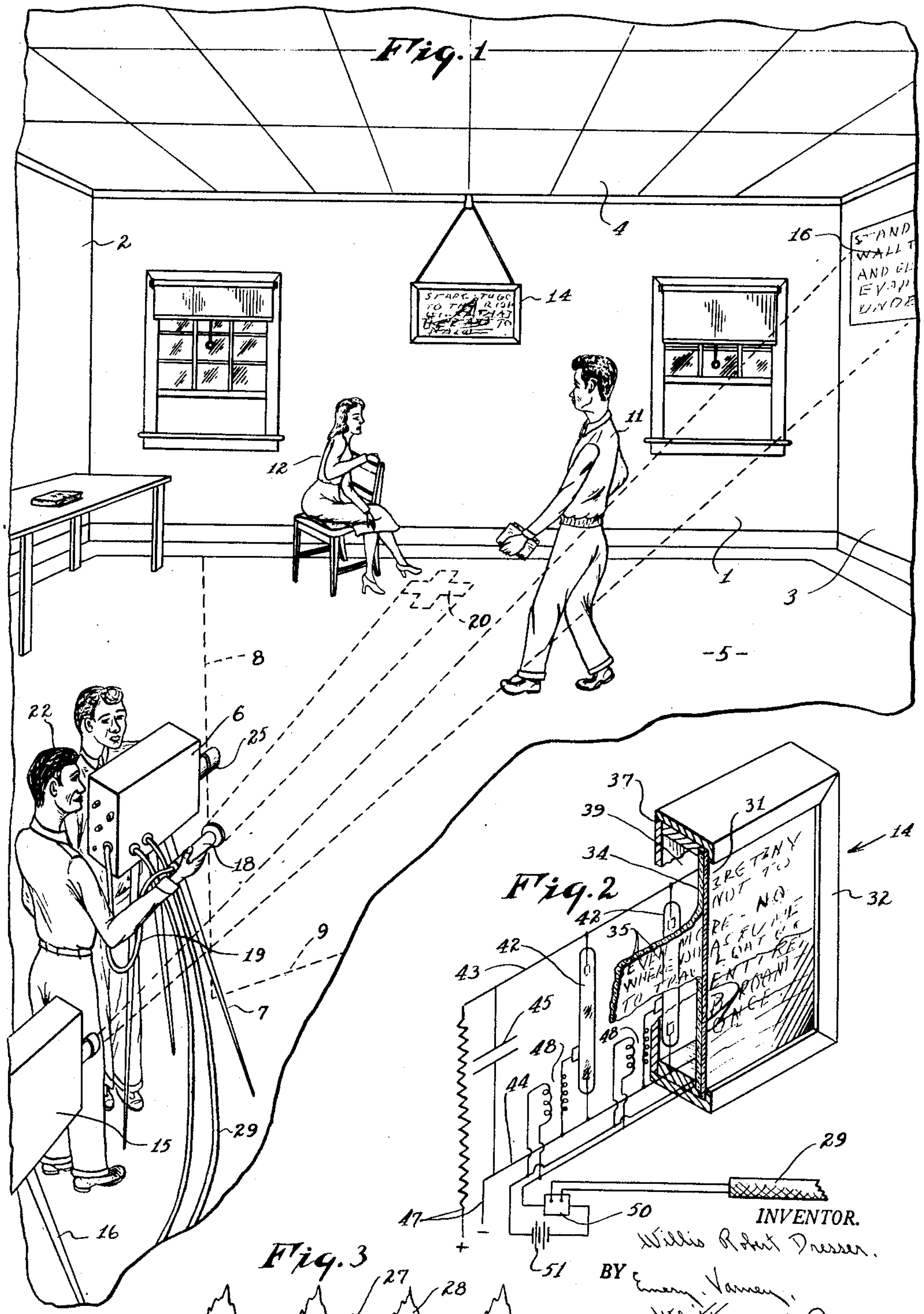
Figure 3:
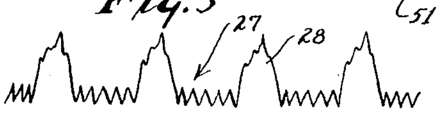

In the drawing forming a part herewith, in which like reference characters indicate corresponding parts in all the views, Figure 1 is a perspective view showing the application of the invention to a set within the field of an electronic camera;

Figure 2 is a fragmentary, diagrammatic view of one of the cue indicators shown in Figure 1; and Figure 3 is a graph showing the power supply cycle of the picture tube in the camera of Figure 1.

Figure 1 shows a set consisting of a room having a back wall 1, side walls 2 and 3, a ceiling 4 and a floor 5. An electronic camera 6 is supported on a tripod 7 within the room, and located in position to give the camera a field indicated by the dotted floor lines 8 and 9. Thus the camera field includes most of the back wall 1 and side wall 3.

The drawing shows two actors 11 and 12 within the camera field. There is a cue indicator 14 which has the appearance of a picture hanging on the back wall 1. This cue indicator is in position to be seen by the actor 11, and its operation will be described in connection with Figure 2.

Another cue indicator is used for giving information to the actor 12. This second cue indicator comprises a projector 15 supported by a tripod 16 in the same manner as a camera. The projector 15 contains a slide with legends thereon; and an image of these legends is projected on the side wall 3 over an illuminated area 16.

Another indicator for cues and other instructions or directions comprises a portable hand light 18, similar to a flash light but supplied with power through a cable 19 connected with the circuit of a picture tube within the electronic camera 6. In the illustrated embodiment of the invention, the hand lamp 18 has a slide or mask for projecting a cross of light 20; but it will be understood that this light 18 can be used to project a spot of any shape for the purpose of indicating locations or directions of movement, or other information to the actors from a director 22 who holds the light 18.

The camera 6 is equipped with a conventional picture tube on which an image is focused by a lens 25 located at the front of the camera. The circuits and control apparatus of picture tubes are constructed so that the picture tube is rendered inoperative to transmit image impulses at the end of each scanning cycle, and this provides a vertical retrace interval, which is referred to herein as the "blind" period of the picture tube and the camera. The apparatus may have controls that supply a "blanking" pulse at the end of each scanning cycle for starting the blind period, and the synchronizing pulse for the apparatus may be transmitted during this blind period. Figure 3 is a diagrammatic showing of a power supply curve 27 for a typical television picture signal with a synchronization pulse 28. Such circuits and controls are well understood in the art, and no further illustration of them is necessary for a complete understanding of this invention.

This invention may be controlled by the blanking pulse, a synchronizing pulse supplied during the blind period, or any pulse from the camera circuit or its control circuit, producing the illumination used by this invention during the time when the picture tube will not be affected by the illumination. Control which obtains the maximum length of time for the illumination is, of course, advantageous.

Figure 2 shows the construction of the cue indicator 14 and the means by which it is illuminated. The source of illumination in the projector 15, and in the hand light 18, may be controlled in the same way, so that the description of Figure 2 serves also for the other cue indicators 15 and 18.

A cable 29 from the electronic camera leads to the cue indicator 14. In order to prevent the cable 29 from being visible, it passes under the floor 5 and behind the back wall 1. The cue indicator 14 includes a front panel 31 which is translucent and which has a picture on its front surface. A frame 32 surrounds the picture and appears to be a part of the furnishing of the room in which the scene is being televised. Behind the front panel 31 there is a rearward panel 34 with legends 35 thereon. In the illustrated construction the legends 35 are letters for spelling out instructions or recitation lines for the actor. If the picture is large, and it is to be viewed from a comparatively short distance, the rearward panel 35 may contain a substantial part, or even all, of the actors' script for the particular scene being televised.

The rearward panel 34 is constructed of a material that is transparent, or at least translucent, and the legends 35 may be opaque on the translucent panel or may be cut-outs of a stencil placed against the rearward panel 34, or in any other way made to stand out in contrast on the rearward panel so that when light is projected against the back of the rearward panel 34, the legends 35 are visible through the front panel 31.

The sides of the frame 32 extend rearwardly and contact with a back panel 37 spaced some distance behind the rearward panel 34 so as to form a housing with a chamber 39 for holding lights 42. These lights are preferably gas-filled tubes of comparatively small diameter so that the chamber 39 can be shallow. This avoids excessive thickness of the picture frame which would make the picture frame look unrealistic.

There are a number of lights or tubes 42 located in the chamber 39 and spaced closely enough to provide adequate illumination over the entire area of the panels 31 and 34.

Each of the lights 42 is connected in parallel across a power supply circuit comprising conductors 43 and 44, and the shunt capacitor 45. Capacitor 45 is charged to a high terminal voltage through the series resistor 46 from an external source of high-voltage, direct current at 47.

Gas-filled discharge lights are used as sources of illumination because their high current conducting ability can provide a bright source of illumination for the extremely short interval required to discharge the resistor isolated capacitor 45 each time gas within the lights becomes ignited.

To provide the accurately timed illumination period required for this method of information transmission the time constant of the capacitor-resistor combination, 45—46, is selected so that during the time interval between light flashes the voltage across the capacitor can charge up to a value just below the self-ignition voltage for the lights 42, and to have the discharge initiated by the starting transformers 48, connected with each lamp, accurately synchronized with the blind periods of the electronic camera tube circuit.

Figure 2 shows the discharge starting transformers 48 actuated by a synchronized impulse from the trigger device 50, preferably a tube connected with a power source 51, and operated by impulses from the conductor 29 leading to the picture tube circuit of the electronic camera.

Incandescent lights having filaments which heat and cool are not suitable for this invention because the time lag in the heating and cooling of the filament is too long to permit convenient synchronizing of the illumination periods of the lights with the blind periods of the picture tube. If incandescent lights have to be used, it is necessary to initiate and shut off the current with a time delay that synchronizes the illumination period with the following blind period of the picture tube.

The preferred embodiment of the invention has been illustrated and described, but changes and modifications can be made and some features can be used in different combinations without departing from the invention as defined in the claims.

What is claimed is:

1. Motion picture making apparatus including an electronic camera which is operable repetitively through a cycle, and which is blind during a portion of each cycle, a set with scenery in the field of the camera, said scenery including a limited area illuminated for a prompter sign, and means illuminating the field with outlines of illumination shaped to convey particular information to actors on the set, the area for informing any actor being located on the set ahead of the position occupied by that actor at the time the information is to be conveyed, instantaneous lighting means for illuminating said limited area, and control apparatus for extinguishing said lighting means, the control apparatus including a synchronizer that operates the instantaneous lighting means in timed relation with the blind periods of the camera to extinguish the lighting means before the termination of each blind period.

2. The motion picture making apparatus described in claim 1, and in which the electronic camera includes an electrical circuit and in which the synchronizer is a pulse generator that supplies a pulse periodically corresponding with the recurring periods during which the camera is blind, and in which the control apparatus for extinguishing the lighting means is connected with said electrical circuit.

3. The motion picture making apparatus described in claim 1, and in which the instantaneous lighting means includes a projector at a location where it is not seen by the camera, the projector being located in position to project an image on said limited area of the set.

4. The motion picture making apparatus described in claim 3, and in which the projector contains a transparency with legends thereon for conveying the information to an actor on the set, and the projector is located in position to project an image of the transparency on said limited area of the set.

5. The combination with an electronic camera having a picture tube operated through a framing cycle that provides a blind period for the picture tube during a portion of each cycle, of a cue indicator comprising a panel for location on a wall or set within the field of the camera, a source of illumination for lighting the panel and displaying legends thereon for the information of actors in the camera field, and means operated in timed relation with the recurring blind periods of the camera for preventing illumination of the panel during the portions of the cycle between the blind periods.

6. A cue indicator for giving information to actors in the field of an electronic camera, said indicator comprising a translucent panel having a picture on the front surface thereof, a rearward panel, behind the translucent panel, having legends for conveying information to actors, a row of gas-filled electric lights located behind the rearward panel in positions to provide illumination of the entire panel when all of said lights are operated simultaneously, a picture frame around the front panel with a rearwardly extending wall connecting with a back panel to provide a housing for enclosing the lights, and control means for lighting and extinguishing said lights including a circuit having control means responsive to a pulse of the picture tube circuit of the electronic camera.

7. Picture-taking apparatus including an electronic camera having a picture tube with a power supply circuit which renders the picture tube blind during a portion of each framing cycle of the camera, a cue indicator comprising a portable hand light for spot projecting to direct actors in the camera field, and a control circuit for the portable hand light connected with the power circuit of the electronic camera and provided with control means that flashes the light in synchronism with at least a portion of the recurring blind periods of the picture tube in the camera.

References Cited in the file of this patent

UNITED STATES PATENTS

| | | |
|---|---|---|
| 1,590,199 | McDonnell | June 29, 1926 |
| 1,959,038 | Ridgway | May 15, 1934 |
| 2,291,931 | Troeger | Aug. 4, 1942 |
| 2,393,316 | Edgerton | Jan. 22, 1946 |
| 2,496,102 | McCord | Jan. 31, 1950 |
| 2,499,181 | Downes et al. | Feb. 28, 1950 |
| 2,598,947 | Thielen | June 3, 1952 |
| 2,635,373 | Barkou | Apr. 21, 1953 |
| 2,651,674 | Theile | Sept. 8, 1953 |

OTHER REFERENCES

Barton et al.: Teleprompter—New Production Tool, Journal SMPTE, June 1952, pages 515–21.